July 9, 1940.  C. E. STOLTZ  2,207,167
APPARATUS FOR TRANSPORTING MATERIAL IN MINES
Filed Aug. 29, 1938   3 Sheets-Sheet 2
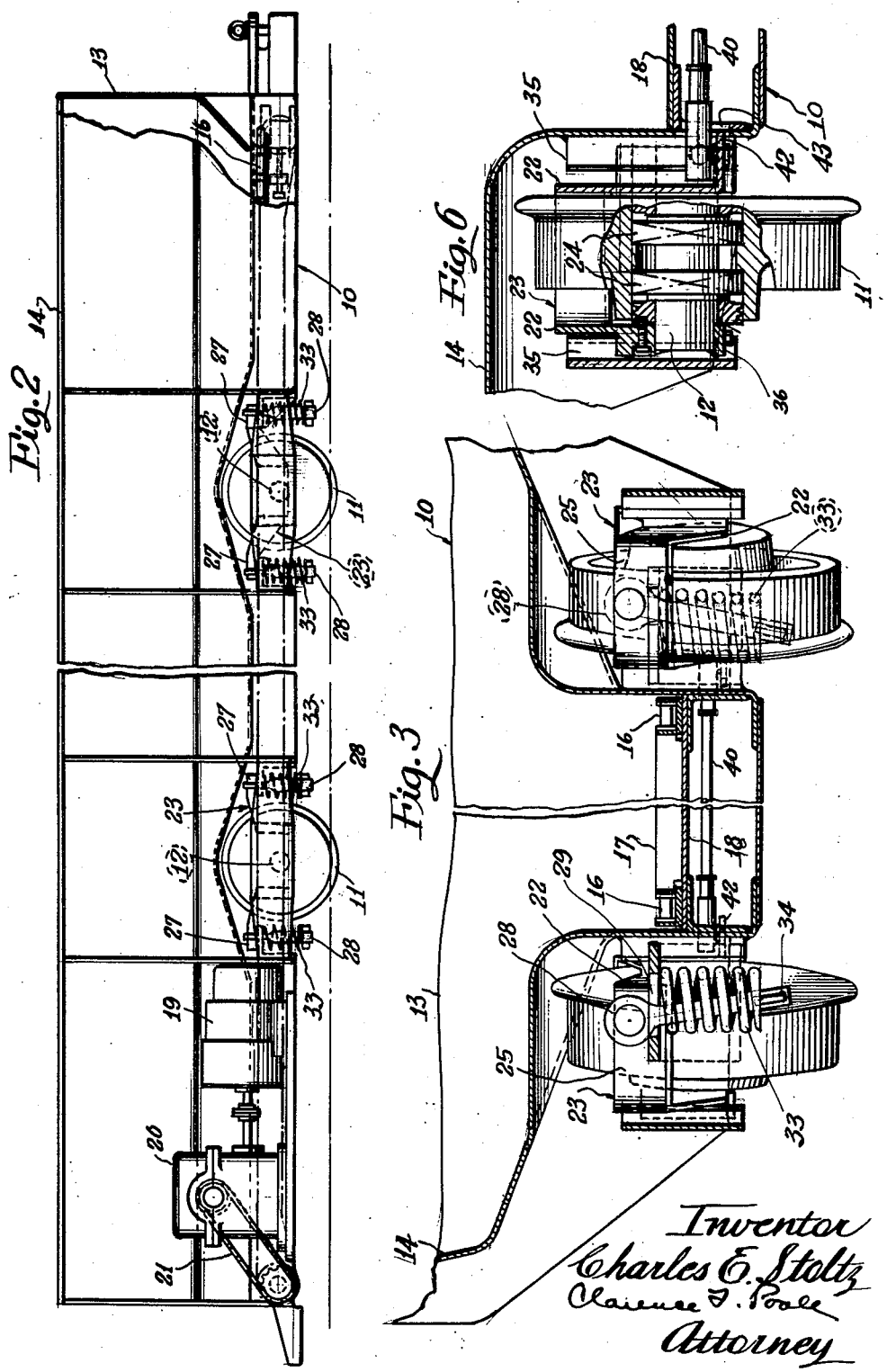

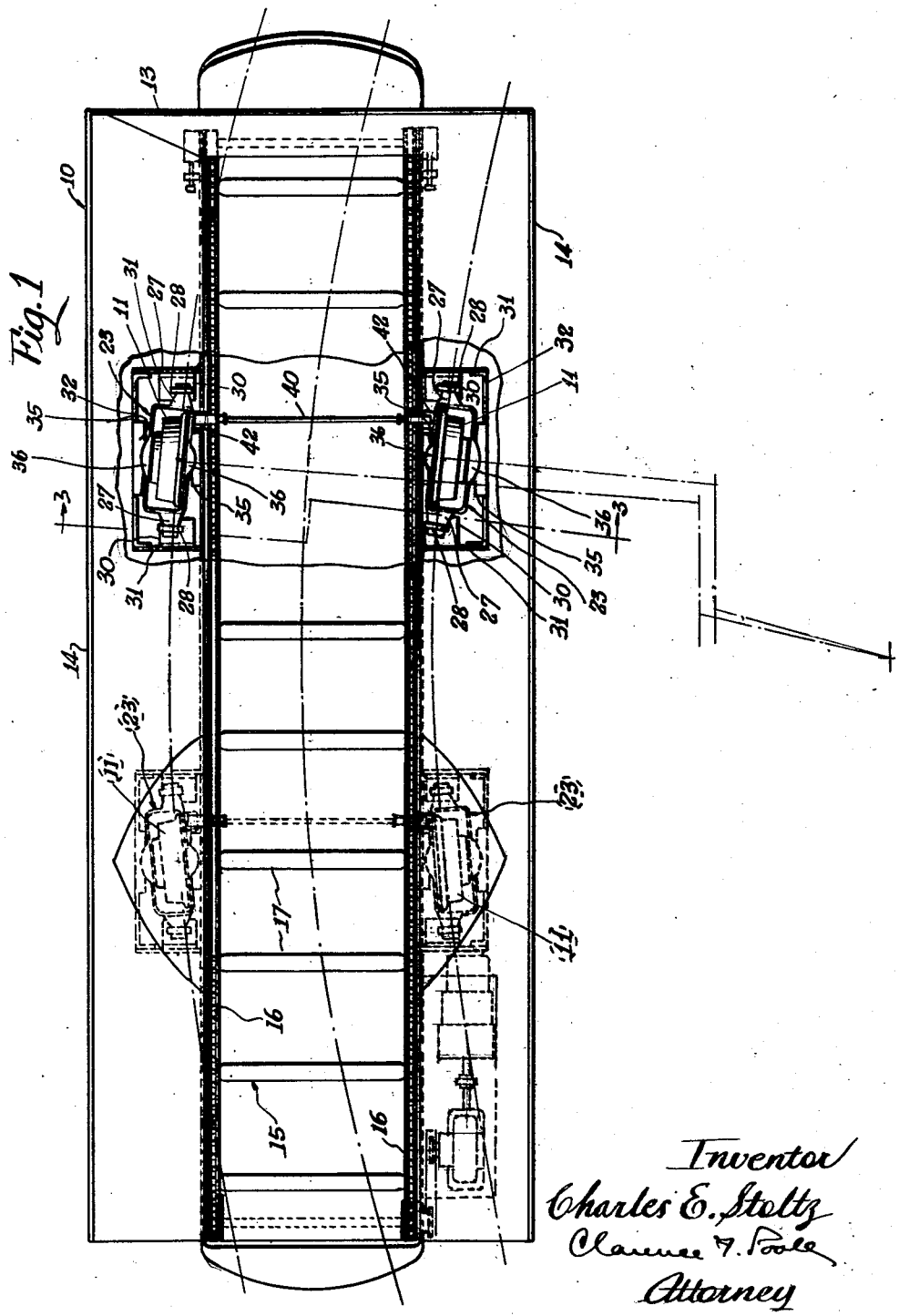

July 9, 1940.  C. E. STOLTZ  2,207,167

APPARATUS FOR TRANSPORTING MATERIAL IN MINES

Filed Aug. 29, 1938  3 Sheets-Sheet 3

Inventor
Charles E. Stoltz
Clarence F. Poole
Attorney

Patented July 9, 1940

2,207,167

UNITED STATES PATENT OFFICE 2,207,167

APPARATUS FOR TRANSPORTING MATERIAL IN MINES

Charles E. Stoltz, Chicago, Ill., assignor to Goodman Manufacturing Company, Chicago, Ill., a corporation of Illinois Application August 29, 1938, Serial No. 227,234

4 Claims. (Cl. 105—170)

This invention relates to improvements in an apparatus for transporting material in mines and more particularly relates to a new and improved form of truck mounting for such an apparatus.

Among the objects of my invention is to provide a new and improved form of self-unloading car having a novel form of truck mounting of a simplified, efficient and compact construction, to permit the car to travel over rough track and readily negotiate sharp curves.

Another object of my invention is to provide a novel form of truck mounting for a large capacity car having a body portion extending laterally beyond the track wheels, which truck mounting is arranged in such a manner that the wheels may turn about vertical axes disposed within the limits of said wheels.

Still another object of my invention is to provide a new and improved truck mounting for a car, which affords an individual spring suspension for the car body on each wheel, and which is so arranged that the wheel mountings are mounted in the car frame for turning movement about a vertical axis and opposite wheel mountings are connected together to permit each pair of wheels to turn together when negotiating curves.

Other objects of my invention will appear from time to time as the accompanying specification proceeds.

My invention may be more clearly understood with reference to the accompanying drawings wherein:

Figure 1 is a plan view of a car constructed in accordance with my invention shown as rounding a curved track, with parts of the car broken away and shown in section;

Figure 2 is a slightly enlarged view of the car in side elevation shown as traveling along a straight track, with certain parts broken away and shown in section;

Figure 3 is an enlarged fragmentary sectional view taken substantially along line 3—3 of Figure 1;

Figure 6 is a transverse sectional view taken substantially along line 6—6 of Figure 4.

Figure 4:
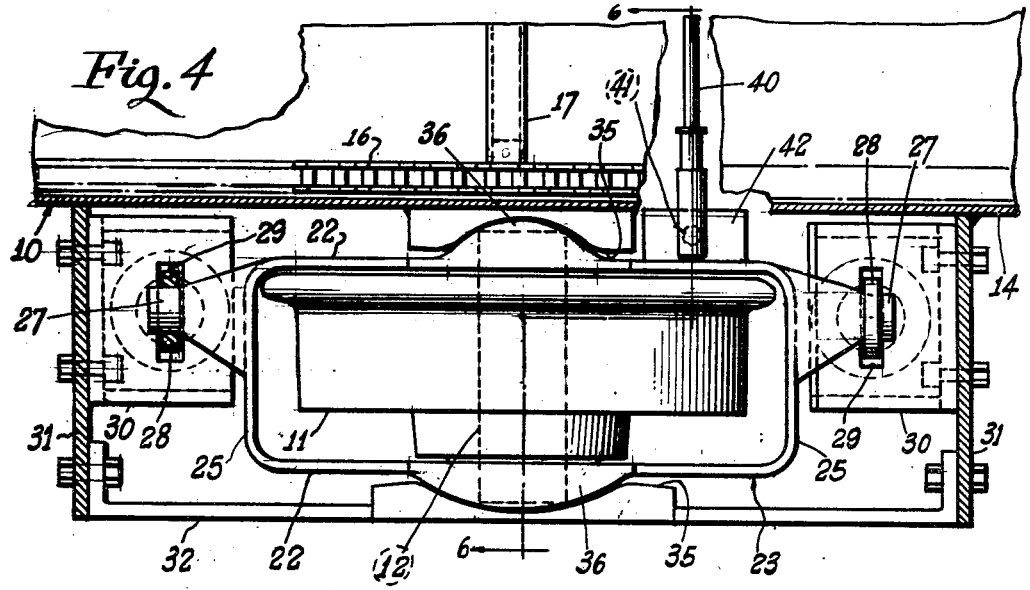
Figure 4 is an enlarged plan view of a portion of the car with parts broken away and shown in horizontal section in order to illustrate certain details of the mounting for one of the car wheels.

In the drawings, the embodiment of my invention illustrated includes a car body or frame, generally indicated by reference character 10, which is mounted on track wheels 11, 11 and axles 12, 12. Said car body or frame is of a type adapted for transporting loose material such as coal in mines and, as herein shown, has a closed forward end 13 and an open rear end, and is provided with outwardly flared and upwardly extending sides 14, 14 which extend upwardly over and laterally beyond the track wheels a substantial distance.

A conveyer 15 extends along the bottom of the car frame between the wheels 11, 11 for unloading material from said car. Said conveyer may be of any type well known to those skilled in the art, but is herein shown as being a flight conveyer and includes a pair of parallel spaced chains 16, 16 having flights 17, 17 mounted therebetween. Said chain and flights move along a pan 18 which forms the bottom of the conveyer. A motor 19 is provided on said car to drive said conveyer. Said motor is herein shown as being of an ordinary electric type, and the drive from said motor to said conveyer includes a speed reducer 20 driven from said motor, and a chain and sprocket drive 21 driven from said speed reducer (see Figure 2).

Referring now in particular to the novel form of mounting for the body or frame 10 on the track wheels 11, 11, for independently suspending the frame on each of the wheels, to prevent derailing of the car when traveling along rough track, and permitting limited turning movement of said wheels with respect to the frame about a vertical axis to enable the car to negotiate relatively sharp curves, each axle 12 is mounted at its ends in opposite sides 22, 22 of a mounting 23. Said axle, as herein shown, has a track wheel 11 journaled thereon, on ball bearings 24, 24. The form and arrangement of each mounting 23 and its method of supporting the car frame on each wheel to permit turning movement of the wheels about a vertical axis when negotiating curves is similar, so a description of one will suffice for all.

Figure 5:
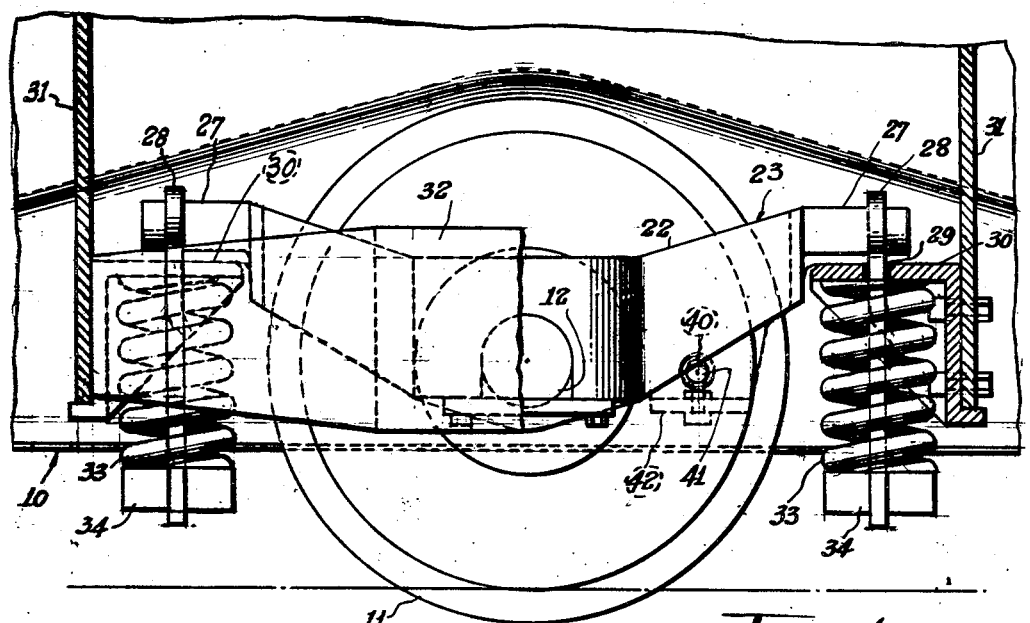
Figure 5 is an enlarged side elevational view of a portion of the car illustrating certain other details of the mounting for the car wheels not shown in Figure 4.

The mounting 23 is a frame-like member having the sides 22, 22 extending along the sides of the wheels and having end pieces 25, 25 connecting these sides together. Said ends have forwardly and rearwardly projecting portions 27, 27, each of which portions is adapted to extend through an eye of a depending eye member 28. Said member extends through a transversely elongated aperture 29 formed in an angle bracket 30 (see Figures 3, 4 and 5). Said angle brackets are secured to a pair of parallel spaced laterally projecting bracket members 31, 31 and, as herein shown, project inwardly towards each other (see Figure 5). The ends of said bracket members are connected together by a longitudinally extending connecting member 32.

The angle brackets 30, 30 are yieldably supported on the eye members 28, 28 for yieldably supporting the car frame on the mountings 23, 23 by means of compression springs 33, 33. Each of said compression springs encircles an eye member and is interposed between the underside of said angle bracket and a key 34 extending through said eye member.

The mounting 23 is pivotally mounted in the car frame for pivotal movement about a vertical axis, herein shown as being disposed within the limits of each wheel, to permit turning of the wheels with respect to the frame, in a pair of spaced apart vertically elongated sockets 35, 35. One of said sockets extends outwardly from the body of the car and the other of said sockets extends inwardly from the connecting member 32. Said sockets are adapted to be engaged by convex projections 36, 36 projecting outwardly from the sides 22, 22 of the mounting 23 and herein shown as being formed integral therewith.

Each front and rear pair of mountings 23, 23 is connected together to cause each pair of wheels to pivotally move together, by means of a transversely extending tie rod 40 pivotally mounted at its ends on ball shaped members 41, 41. Said members are secured to and extend upwardly from brackets 42, 42 which project inwardly from the inner sides 22, 22 of the mountings 23, 23. Said tie rods and brackets extend through suitable openings 43, 43 formed in the frame beneath the bottom pan 18 of the conveyor 15, to permit pivotal and vertical movement of said car wheels with respect to each other (see Figure 6).

It should be noted that since the mounting 23 turns in the sockets 35, 35, and since the car body is individually spring suspended on opposite ends of each mounting, that upon turning movement of each wheel about a vertical axis, the eye members 28, 28 will move angularly with respect to the angle brackets 30, 30 in the elongated apertures 29, 29, as is illustrated in Figure 3, said eye members limiting pivotal movement of the car wheels.

It may thus be seen that a new and improved self-unloading car particularly adapted for use in mines has been provided, which is independently spring mounted on four wheels, which wheels are turnable about a vertical axis to permit the car to negotiate sharp curves and which are recessed within said frame in such a manner as to permit the car to have a relatively large capacity and travel along tracks of relatively narrow gauges.

It may also be seen that with the truck arrangement herein described, the use of two wheels to each truck to permit one wheel to guide the other around a curve has been dispensed with, thus providing a more simplified form of wheel support for the car which utilizes less material carrying body space of the car than former truck mountings.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a track mounted car, a frame, a plurality of track wheels, a mounting for each of said wheels, said mountings extending along opposite sides of and across the ends of said wheels and projecting forwardly and rearwardly therefrom, yieldable means supporting said frame on opposite of said projecting ends of said mountings, convex formations on opposite sides of each of said mountings intersected at their center by an axis extending through the center of rotation of said wheel, and vertically elongated facing concave sockets formed in said frame, said sockets being adapted to be engaged by said convex formations to permit pivotal and vertical movement of said mountings and wheels with respect to said frame.

2. In a track mounted car, a frame, a plurality of track wheels, a mounting for each of said wheels, said mounting extending along opposite sides of and across the ends of said wheels and projecting forwardly and rearwardly therefrom, yieldable means supporting said frame on opposite of said projecting ends of said mountings, convex formations on opposite sides of each of said mountings intersected at their center by an axis extending through the center of rotation of said wheel, and a pair of parallel spaced vertically elongated facing sockets formed in said frame, said sockets being adapted to be engaged by said convex formations to permit pivotal and vertical movement of said mountings and wheels with respect to said frame, and members extending transversely of said frame and pivotally connected to opposite pairs of said mountings to hold opposite wheels for pivotal movement together.

3. In a car truck, a frame, a wheel, an axle on which said wheel is mounted, a mounting for said axle, said mounting extending around said wheel and having said axle mounted in opposite slides thereof, said mounting also having outwardly facing convex formations on opposite sides thereof intersected at their center by an axis extending through the axis of rotation of said wheel, a pair of facing vertically elongated sockets formed in said frame and being adapted to be engaged by said formation on said mounting to permit pivotal and vertical movement of said wheels with respect to said frame, and springs interposed between opposite ends of said mounting and said frame for suspending said frame on said mountings.

4. In a car, a frame, a plurality of wheels, an axle for each of said wheels, a mounting for each of said axles, said mounting extending around said respective wheel and having said axle mounted in opposite sides thereof, said mounting also having outwardly facing convex formations on opposite sides thereof intersected at ther centers by an axis extending through the axis of rotation of said wheel, a plurality of pairs of facing vertically elongated sockets formed in said frame, said sockets being adapted to be engaged by said convex formations to permit pivotal and vertical movement of said wheels with respect to said frame, a member extending across said frame and having pivotal connection with opposite of said mountings for pivotally moving said wheels and mountings together, and springs interposed between opposite ends of each of said mountings and said frame for suspending said frame on said mountings.

CHARLES E. STOLTZ.